US012801903B2

(12) United States Patent
Ambrogio et al.

(10) Patent No.: US 12,801,903 B2
(45) Date of Patent: Nov. 17, 2026

(54) CALIBRATION PROCEDURE FOR ON-CHIP NEURAL NETWORK

(71) Applicant: International Business Machines Corporation, Armonk, NY (US)

(72) Inventors: Stefano Ambrogio, San Jose, CA (US); Pritish Narayanan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 27 days.

(21) Appl. No.: 18/124,055

(22) Filed: Mar. 21, 2023

(65) Prior Publication Data

US 2024/0320477 A1 Sep. 26, 2024

(51) Int. Cl.
*G06N 3/048* (2023.01)
*G06F 7/544* (2006.01)
*G06N 3/065* (2023.01)

(52) U.S. Cl.
CPC ........... *G06N 3/048* (2023.01); *G06F 7/5443* (2013.01); *G06N 3/065* (2023.01)

(58) Field of Classification Search
None
See application file for complete search history.

(56) References Cited

U.S. PATENT DOCUMENTS 10,867,239 B2 12/2020 Gupta et al.
10,970,441 B1 4/2021 Zhang et al.
11,436,429 B2 9/2022 Jaganathan et al.

OTHER PUBLICATIONS

Joshi et al., Accurate deep neural network inference using computational phase-change memory, Nature Communications | (2020) 11:2473 | https://doi.org/10.1038/s41467-020-16108-9 | www.nature.com/naturecommunications; pp. 1-13 (Year: 2020).*
Mackin et al., Optimised weight programming for analogue memory-based deep neural networks, Nature Communications | (2022) 13:3765 | https://doi.org/10.1038/s41467-022-31405-1 | www.nature.com/naturecommunications; pp. 1-12 (Year: 2022).*
Krishnamoorthi; Quantizing deep convolutional networks for efficient inference: A whitepaper; arXiv:1806.08342v1 [cs.LG] Jun. 21, 2018; pp. 1-36 (Year: 2018).*
(Continued)

*Primary Examiner* — Alan Chen
(74) *Attorney, Agent, or Firm* — Scully, Scott, Murphy & Presser, P.C.; Edward J. Wixted, III

(57) ABSTRACT

Weights of a layer of an artificial neural network can be programmed on a crossbar array of resistive memory devices. The programmed weights can be calibrated to counteract fixed variability sources like CMOS variability by adjusting the programmed weights based on comparing the crossbar array's output with a target output. The crossbar array's output produced using the calibrated programmed weights can be input into a next crossbar array of resistive memory devices implementing a next layer of the artificial neural network to calibrate weights of the next layer of the artificial neural network programmed on the next crossbar array. The weights of the next layer of the artificial neural network programmed on the next crossbar array can be calibrated by adjusting the weights of the next layer based on comparing the next crossbar array's output with a next target output.

20 Claims, 5 Drawing Sheets

(56) References Cited

OTHER PUBLICATIONS

Disclosed Anonymously, "An On Chip Calibration System using a VCO Based Comparator System", An IP.com Prior Art Database Technical Disclosure, IP.com No. IPCOM000181418D, IP.com Electronic Publication Date: Apr. 1, 2009, 5 pages.
Disclosed Anonymously, "Method of Maximizing Pattern Uniformity in Semiconductor Designs Using On-Chip Fill Configurations", An IP.com Prior Art Database Technical Disclosure, IP.com No. IPCOM000193497D, IP.com Electronic Publication Date: Feb. 26, 2010, 7 pages.
Disclosed Anonymously, "Channel Skipping with Dynamic Frequency Modulation for Error Resiliency in Neural Network", An IP.com Prior Art Database Technical Disclosure, IP.com No. IPCOM000266627D, IP.com Electronic Publication Date: Aug. 3, 2021, 5 pages.
Disclosed Anonymously, "An Accelerator for Deep Neural Network Bottleneck Layers with a Method for Placement of Data Structures to Improve Core Utilization", An IP.com Prior Art Database Technical Disclosure, IP.com No. IPCOM000269389D, IP.com Electronic Publication Date: Apr. 13, 2022, 6 pages.
Kendall, J., et al., "Training End-to-End Analog Neural Networks with Equilibrium Propagation", arXiv:2006.01981v2 [cs.NE], Jun. 9, 2020, 31 pages.
Patane, A., et al., "Calibrating the Classier: Siamese Neural Network Architecture for End-to-End Arousal Recognition from ECG", International Conference on Machine Learning, Optimization, and Data Science, LOD 2018: Machine Learning, Optimization, and Data Science, First Online Feb. 14, 2019, 12 pages.
Wang, G., et al., "End-to-End Implementation of Various Hybrid Neural Networks on a Cross-Paradigm Neuromorphic Chip", Frontiers in Neuroscience, Accepted Jan. 8, 2021, Published Feb. 2, 2021, pp. 1-13, vol. 15, Article 615279.

* cited by examiner

CALIBRATION PROCEDURE FOR ON-CHIP NEURAL NETWORK

BACKGROUND

The present application relates generally to analog memory-based artificial neural networks and more particularly calibrating and/or programming on-chip of hardware neural networks.

Analog memory crossbar arrays implementing multiply and accumulate (MAC) operations can accelerate performance of deep learning neural networks or deep neural networks (DNNs). For example, voltage provided as inputs to such analog memory crossbar arrays storing synaptic weights as conductance can generate current, which can represent a product or multiplication between the input vector and the synaptic weight matrix, and resulting in a multiply accumulate operation, or vector matrix multiplication. The precision achieved during a multiply-and-accumulate (MAC) operation strongly depends on the programming accuracy achieved on weights and on the input resolution. While analog neural network hardware should perform MAC operations as fast and accurately as possible, incorrect mapping of weights on hardware can lead to poor performance by the analog memory crossbar arrays and may result in inaccurate neural network outputs.

BRIEF SUMMARY

The summary of the disclosure is given to aid understanding of calibration of on-chip neural network, and not with an intent to limit the disclosure or the invention. It should be understood that various aspects and features of the disclosure may advantageously be used separately in some instances, or in combination with other aspects and features of the disclosure in other instances. Accordingly, variations and modifications may be made to the computer system and/or their method of operation to achieve different effects.

A method, in an aspect, can include programming weights of a layer of an artificial neural network on a crossbar array of resistive memory devices. The method can also include calibrating the programmed weights by adjusting the programmed weights based on comparing the crossbar array's Multiply-and-Accumulate (MAC) output with a target MAC output. The method can further include inputting the crossbar array's MAC output produced using the calibrated programmed weights into a next crossbar array of resistive memory devices implementing a next layer of the artificial neural network to calibrate weights of the next layer of the artificial neural network programmed on the next crossbar array. The method can also include calibrating the weights of the next layer of the artificial neural network programmed on the next crossbar array by adjusting the weights of the next layer based on comparing the next crossbar array's output with a next target output, where programmed weights of a subsequent crossbar array corresponding to a subsequent layer of the artificial neural network are calibrated using, as input, hardware output produced by a previous crossbar array corresponding to a previous layer of the artificial neural network.

Advantageously, the method can improve the overall precision of MAC operations, for example, performed by a crossbar array. For analog memory-based artificial neural network implemented with such crossbar arrays, the prediction accuracy can be improved.

An apparatus, in an aspect, can include a plurality of crossbar arrays of resistive memory devices configured to implement a multi-layer artificial neural network, where a crossbar array of the plurality of crossbar arrays has programmed weights of a layer of an artificial neural network. The apparatus can also include at least one peripheral circuit connected to the crossbar array configured to calibrate the programmed weights by adjusting the programmed weights based on comparing the crossbar array's Multiply-and-Accumulate (MAC) output with a target MAC output. The crossbar array's MAC output produced using the calibrated programmed weights can be input into a next crossbar array of the plurality of crossbar arrays that implements a next layer of the artificial neural network to calibrate weights of the next layer of the artificial neural network programmed on the next crossbar array. At least another peripheral circuit connected to the next crossbar array is configured to calibrate the weights of the next layer of the artificial neural network programmed on the next crossbar array by adjusting the weights of the next layer based on comparing the next crossbar array's output with a next target output. Programmed weights of a subsequent crossbar array corresponding to a subsequent layer of the artificial neural network can be calibrated using, as input, hardware output produced by a previous crossbar array corresponding to a previous layer of the artificial neural network.

Advantageously, the apparatus can improve the overall precision of MAC operations. For analog memory-based artificial neural network implemented with such apparatus, the prediction accuracy can be improved.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
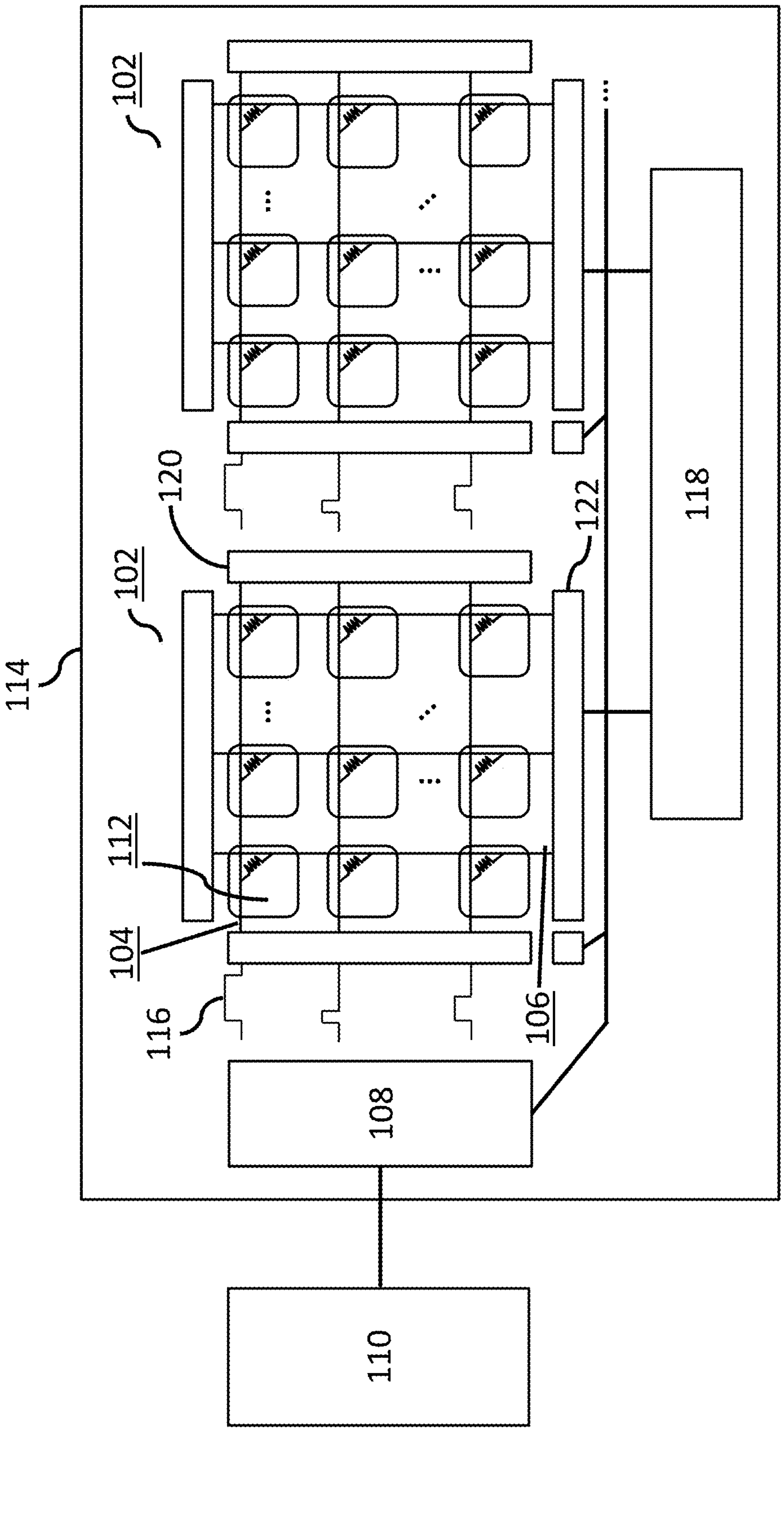
FIG. 1 is a diagram illustrating an example device implementing a hardware neural network in an embodiment.

Analog memory-based neural network may utilize storage capability and physical properties of memory devices such as resistive or non-volatile memory (NVM) devices to implement an artificial neural network. This type of in-memory computing hardware increases speed and energy efficiency, providing potential performance improvements. For example, rather than moving data from dynamic random access memory (DRAM) to a processor such as a central processing unit (CPU) to perform a computation, analog neural network chips perform computation in the same place where the data is stored. Because there is no movement of data, tasks can be performed faster and require less energy.

An implementation of an artificial neural network can include a succession of layers of neurons, which are interconnected so that output signals of neurons in one layer are weighted and transmitted to neurons in the next layer. A neuron Ni in a given layer may be connected to one or more neurons Nj in the next layer, and different weights wij can be associated with each neuron-neuron connection Ni–Nj for weighting signals transmitted from Ni to Nj. A neuron Nj generates output signals dependent on its accumulated inputs applied to an activation function, and weighted signals can be propagated over successive layers of the network from an input to an output neuron layer. Briefly, an activation function decides whether a neuron should be activated, or a level of activation for a neuron, for example, an output of the neuron. An artificial neural network machine learning model can undergo a training phase in which the sets of weights associated with respective neuron layers are determined. The network is exposed to a set of training data, in an iterative training scheme in which the weights are repeatedly updated as the network "learns" from the training data. The resulting trained model, with weights and biases defined via the training operation, can be applied to perform a task based on new data, for example, used in inference phase or for inference.

After a neural network is trained in software, weights can be programmed in the analog hardware. For instance, analog memory-based crossbar arrays or structures implementing a neural network perform parallel vector-multiply operations, with excitation vectors introduced, for example, onto multiple row-lines in order to perform multiply and accumulate operations across an entire matrix of stored weights encoded into the conductance values of analog nonvolatile resistive memories.

In addition, a calibration (slope and offset correction) can be performed to counteract any fixed non-ideality that actual analog hardware shows. Calibration can include a comparison of the actual hardware MAC result with the ideal expected MAC result or a target, followed by appropriate correction of the hardware parameters. This calibration can become more complex when multiple neural network layers are used or involved, since the signal cascades from one layer to the next one, propagating noise and non-idealities of hardware. In one or more embodiments, systems, methods and/or techniques can be provided, which can provide for a reliable calibration that ensures the best possible inference performance in terms of accuracy. In this way, for example, systems, methods and/or techniques can improve the hardware-based artificial neural network such as the analog-memory based artificial neural network and/or digital hardware based artificial neural network, improve the precision of multiply and accumulate operations performed on such a hardware network.

FIG. 1 is a diagram illustrating an example device implementing a hardware neural network in an embodiment. Computational memories based on crossbar arrays (a block diagram of a crossbar array shown at 102 for simplicity of explanation) using electronic devices, which can include resistive memories such as resistive non-volatile memory (NVM) 112, can be used for artificial neural network (ANN) computations, for example, for training a deep neural network (DNN) and/or as inference accelerators for inferences with such networks. For instance, in deep learning or neural network inference, data propagation through multiple layers of a neural network involves a sequence of matrix multiplications. Each layer can be represented as a matrix of synaptic weights. These weights can be stored in the conductance states of NVM 112. These NVM 112 can be arranged in crossbar arrays, creating an artificial neural network where all matrix multiplications are performed in-place in an analog manner. For example, the arrays on the chip can directly relate to the synapse layers of the neural network. A non-volatile memory (NVM) or NVM device (also referred to as a memristive device or technology) can maintain values stored on such a device even when the power supply is turned off. In neural network implementations, those values can represent synaptic weights or weights of a neural network. In an embodiment, for instance, a crossbar array 102 (also referred to as a tile) can represent a layer of the neural network. In an embodiment, for instance, a column of the crossbar array 102 can represent a neuron of a layer of the neural network.

An analog memory-based device 114 ("device 114") is shown in FIG. 1. Device 114 can have multiple tiles 102, each tile corresponding to a layer of the neural network. Device 114 can be a co-processor or an accelerator, and device 114 can sometimes be referred to as an analog fabric (AF) engine. One or more digital processors 110 can communicate with device 114, and facilitate operations or functions of device 114. In one embodiment, digital processor 110 can be a field programmable gate array (FPGA) board. Digital processor 110 can be any other digital processor. Device 114 can also be interfaced to components, such as digital-to-analog converters (DACs), that can provide power, voltage and current to device 114. Digital processor 110 can implement digital logic to interface with device 114 and other components such as the DACs.

In an embodiment, device 114 can include a plurality of multiply accumulate (MAC) hardware having a crossbar structure or array. A crossbar array 102 of a MAC unit is also referred to as a tile. There can be multiple crossbar structures or arrays, which can be arranged as a plurality of tiles. While FIG. 1 shows two MAC hardware (two tiles), there can be additional (e.g., more than two) MAC tiles integrated in device 114. By way of example, tile 102 can include electronic devices such as a plurality of memory elements 112, which for example include resistive memory. Memory elements 112 can be arranged at cross points of the crossbar array. At each cross point or junction of the crossbar structure or crossbar array, there can be at least one memory element 112 including an analog memory element such as resistive RAM (ReRAM), conductive-bridging RAM (CBRAM), NOR flash, magnetic RAM (MRAM), and phase-change memory (PCM), and/or another memory element. In an embodiment, such analog memory element can be programmed to store synaptic weights of an artificial neural network (ANN).

In an aspect, each tile 102 can represent a layer of an ANN. Each memory element 112 can be connected to a respective one of a plurality of input lines 104 and to a respective one of a plurality of output lines 106. Memory elements 112 can be arranged in an array with a constant distance between crossing points in a horizontal and vertical dimension on the surface of a substrate. Each tile 102 can perform vector-matrix multiplication. By way of example, tile 102 can include peripheral circuitry such as pulse width modulators at 120 and peripheral circuitry such as readout circuits 122. One or more peripheral circuitry connected to tile 102 or crossbar array, can scale or normalize the inputs and synaptic weights. Normalizing or normalization herein is also referred to as scaling.

Electrical pulses 116 or voltage signals can be input (or applied) to input lines 104 of a crossbar array or tile 102. Output currents can be obtained from output lines 106 of the crossbar structure, for example, according to a multiply-accumulate (MAC) operation, based on the input pulses or voltage signals 116 applied to input lines 104 and the values (synaptic weights) stored in memory elements 112. One or more peripheral circuitry connected to tile 102 or crossbar array, can function to scale or normalize the inputs and synaptic weights.

Tile 102 can include n input lines 104 and m output lines 106. Controller 108 (e.g., global controller) can program memory elements 112 to store synaptic weights values of an artificial neural network, for example, to have electrical conductance (or resistance) representative of such values. Controller 108 can include (or can be connected to) a signal generator (not shown) to couple input signals (e.g., to apply pulse durations or voltage biases) into the input lines 104 or directly into the outputs.

In an embodiment, readout circuits 122 can be connected or coupled to read out the m output signals (electrical currents) obtained from the m output lines 106. Readout circuits 122 can be implemented by a plurality of analog-to-digital converters (ADCs). Readout circuit 122 may read currents as directly output from the crossbar array, which can be fed to another hardware or circuit 118 that can process the currents, such as performing compensations or determining errors.

Processor 110 can be configured to input (e.g., via the controller 108) a set of input vectors into the crossbar array. In one embodiment, the set of input vectors, which is input into tile 102, can be encoded as electrical pulse durations. In another embodiment, the set of input vectors, which is input into tile 102, can be encoded as voltage signals. Processor 110 can also be configured to read, via controller 108, output vectors from the plurality of output lines 106 of tile 102. The output vectors can represent outputs of operations (e.g., MAC operations) performed on the crossbar array based on the set of input vectors and the synaptic weight stored in memory elements 112. In an aspect, the input vectors get multiplied by the value (e.g., synaptic weight) stored on memory elements 112 of tile 102, and the resulting products are accumulated (added) column-wise to produce output vectors in each one of those columns (output lines 106). At each of the column output line, there also can be a device, e.g., digital or analog, which may perform an activation function based on the output at the column lines (e.g., the accumulated column-wise output).

Figure 2:
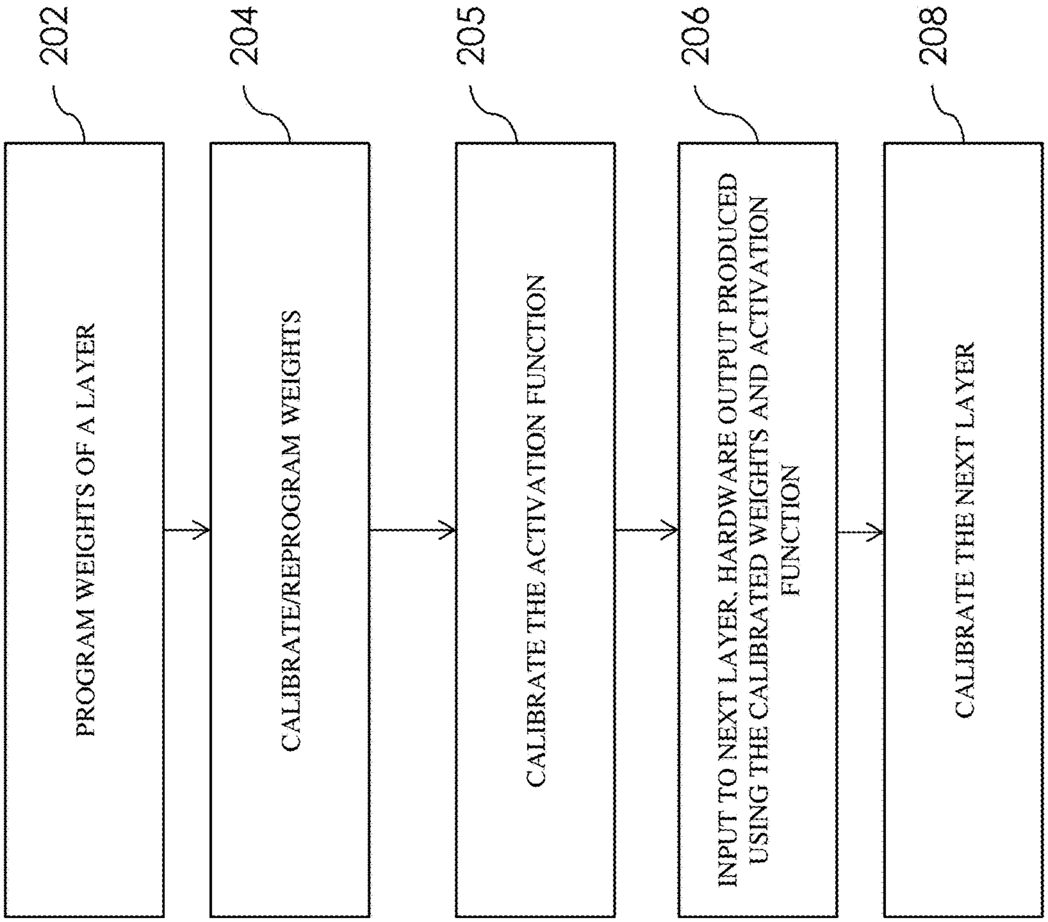
FIG. 2 is a flow diagram illustrating a method in an embodiment.

FIG. 2 is a flow diagram illustrating a method in an embodiment. The method or procedure calibrates a multi-layer neural network on hardware such as analog and/or digital hardware. The procedure or method can be performed on a device having multiple crossbar arrays or tiles capable of storing programmed weights associated with multiple layers of the neural network, for example, described with reference to FIG. 1. For example, hardware that implements a multi-layer (multiple layer) neural network includes multiple tiles, where a tile represents a layer of neurons of the neural network. Peripheral circuitry at 122 can perform analog conversion (e.g., from analog voltage to modulated pulse-width) or digital conversion (e.g., from analog voltage to bits). Such peripheral circuitry can be affected by intrinsic variability (CMOS variability, etc.) that can be calibrated using proper techniques.

In an aspect, the programmed weights of any layer k may be different from the target weights to calibrate, for instance, because of hardware non-idealities. For instance, the programmed weights of layer k can be adjusted to account for non-ideal slope and/or offset effects. In addition, programmed weights of layer k can also be modified accounting for a residual error arising from previous layers 0 to k−1, by using outputs of the previous layer as calibration inputs for this layer k, for example, as compared to a case when random inputs are applied in a standalone calibration setting.

At 202, weights of a layer of an artificial neural network are programmed on a crossbar array of resistive memory devices, e.g., a tile of a computer chip or integrated circuit. Initially, the values of programmed weights are those generated by training the artificial neural network via a training phase.

At 204, the method can include calibrating the programmed weights by adjusting the programmed weights based on comparing the crossbar array's output (Multiply-and-Accumulate (MAC) output) with a target output (MAC output), e.g., a software output produced at the layer of the artificial neural network run on a digital processor. For example, sample inputs, such as those from training data (e.g., a training dataset), random input (e.g., a random dataset), or another sample input can be provided to a tile (a crossbar array), for example, on the input row lines, to perform MAC operation on the tile, where the column-wise output (MAC output) can be provided at the column lines. For simplicity of explanation, the output provided by the crossbar array can be referred to as a hardware MAC ($HW_{MAC}$).

This experimental output result from the hardware operation (e.g., also referred to as $HW_{MAC}$) can be compared with the output from a software implementation of the neural network. For example, the software implementation's output can be used as a reference or target for correcting the hardware operation. The software implementation's output can be computed by a digital computer or processor and received for performing this comparison. For instance, the software implementation of the neural network with its trained weights can be run on a digital computer and its output produced at a layer being processed can be stored or received.

Based on the comparison between the hardware's output ($HW_{MAC}$) and the software implementation's output ($SW_{MAC}$), the weights of the first layer programmed on the tile can be adjusted. For example, a software implementation's output at a node of a layer can be compared to a hardware's output at a column of the crossbar array. For instance, a node of a layer of a neural network corresponds to a column of a crossbar array.

Comparing the hardware's output ($HW_{MAC}$) and the software implementation's output ($SW_{MAC}$) can include fitting the hardware's output to the software implementation's output. Fitting produces parameters such as a coefficient (e.g., a slope) and a bias. The programmed weights can be adjusted by those parameters. An example of fitting can be: $SW_{MAC}=\alpha\ HW_{MAC}+\beta$. Thus, for example, the hardware weights at a column can be adjusted by $\alpha$ and $\beta$.

In case the peripheral circuitry is analog, for example, there is no digital postprocessing, the following procedures can be performed. Weights are reprogrammed, scaling the programmed weights column-wise by a vector with the same number of elements ($\alpha$'s) as the number of columns in the analog tile (crossbar array). Bias weights are programmed to $-\beta$ (minus or negative $\beta$) to compensate for hardware offset. Bias weights are weights located on rows where the input can be turned on all the time. At 205, activation function (as, for example, rectified linear unit (ReLU) performed with analog circuitry), is calibrated also to match, e.g., as closest as possible, the activation function output of the hardware with the software implementation's activation function output. Activation function calibration can be done by tuning peripheral circuitry knobs, such as integration timing, duration generation, and others.

In case the peripheral circuitry is digital, a and R can be applied in the digital domain, e.g., perform calculations on a digital processor. For instance, the hardware's MAC result ($HW_{MAC}$) can be rescaled numerically by α and β. Activation function can be numerically applied.

In an embodiment, this finishes the calibration of the first layer. At 206, the method can include inputting the crossbar array's output produced using the calibrated programmed weights and activation function into a next crossbar array of resistive memory devices implementing a next layer of the artificial neural network to calibrate weights of the next layer of the artificial neural network programmed on the next crossbar array.

The second layer (e.g., the next layer) can be programmed on a second tile, using, as the input to the second tile, the output of the previous tile. That is, the output of the first (previous) tile or layer, computed after that previous tile's weights have been adjusted or calibrated as described above, is fed as input to the second tile, in calibrating the second tile. At 208, the method can include calibrating the weights of the next layer of the artificial neural network programmed on the next crossbar array by adjusting the weights of the next layer based on comparing the next crossbar array's output with a next target output. For example, the next target output can be a software output produced at the next layer of the artificial neural network run on a digital processor. Calibrating at 208 of this next layer can include the similar processing performed at 204 and 205 for calibrating that layer. For example, in the case of an analog peripheral circuit, fitting, reprogramming and scaling using the fitted parameter, bias weight programming by the fitted bias value, and calibrating the activation function. In the case of a digital peripheral circuit, the crossbar array's results can be rescaled by the coefficient and the bias, by performing a digital computation on a digital peripheral circuit connected to the crossbar array; and an activation function can be numerically or computationally adjusted to substantially match a target activation function on a digital peripheral circuit connected to the crossbar array.

The above steps are repeated for all subsequent layers. In the iteration after the first layer's training, the input to the next layer at 206 is the output of the previous layer, instead of a sample input used in the first layer. That is, subsequent layers are programmed always using, as the input, the actual hardware output or signal of the previous layer. For instance, programmed weights of a subsequent crossbar array corresponding to a subsequent layer of the artificial neural network are calibrated using, as input, hardware output produced by a previous crossbar array corresponding to a previous layer of the artificial neural network. In this way, the signals cascaded from previous layer are used in calibration a next layer. Cascading the signal can account for non-idealities that come from the previous layer, and thus can reduce the errors such as non-linear errors which may otherwise get propagated along the layers.

The procedure described above can provide improvements to methods that may calibrate every layer or tile independently. For instance, the procedure described above considers and corrects possible accuracy degradation contributed by the noise and non-idealities exhibited from previous hardware layers. For instance, an incomplete calibration of the outputs of layer 0 leading to consistently weaker signals at the input of layer 1, can lead to accuracy degradation in calibration techniques which do not consider this signal cascading. For example, the hardware circuitry can be sensitive to the absolute magnitude of the input signal, and in an aspect, using the actual data generated from the previous layer, and thus performing cascading calibration can improve accuracy.

In addition, non-linearities arising from residual error in previous layers can be smoothed out by calibration of subsequent layers. For instance, even if there exist errors such as non-linear errors from noise and circuit non-linearities, that have not been completely removed by the calibration of the previous layers, cascading the outputs or signals from previously layers can compensate for such non-linear errors. For example, non-linear errors, which may remain after the fitting can be compensated or corrected by cascading the signals from the previous layer. For example, in calibrating the current layer using signals from the previous layer as input to the current layer, the propagated non-linear error from the previous layer can be reduced.

Figure 3:
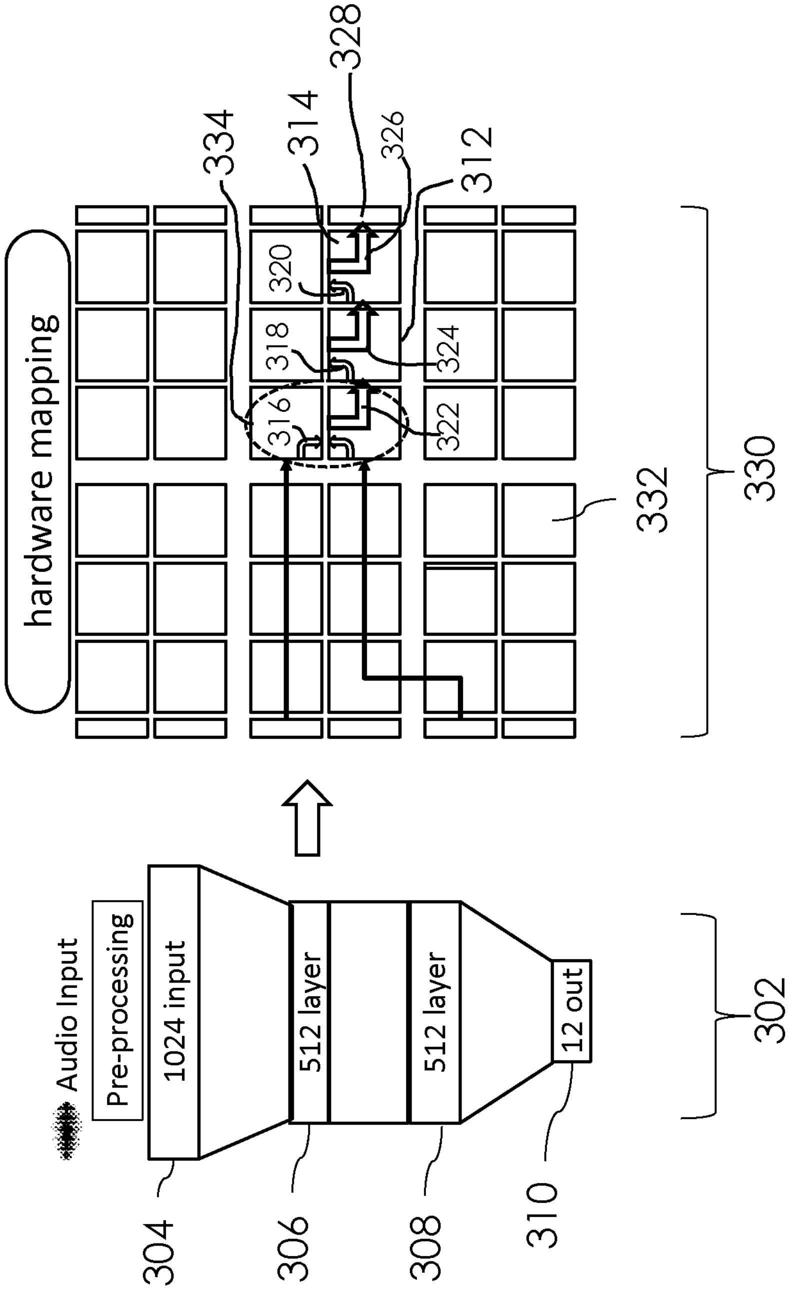
FIG. 3 shows an example calibration implemented on an analog chip or integrated circuit in an embodiment.

The method described herein can be applicable to digital and/or analog multiply and accumulate software and/or hardware. FIG. 3 shows an example calibration implemented on an analog chip in an embodiment. A 3-weight layer neural network model 302 is mapped on an analog chip 330. The analog chip 330 includes multiple tiles or crossbar arrays. A tile or crossbar array is shown at 332. Input is fed into first layer 304, weighted values from the first layer 304 are fed into a second layer 306, weighted values from the second layer 306 are fed into a third layer 308, and the output layer is shown at 310. Input data can be any type of data. Example input data can be, but not limited to, audio data. Input data can be preprocessed, for example, for neural network processing. On the hardware chip 330, the first layer 304 is mapped onto two tiles, as one large array 334. The second layer 306 is mapped onto a second array 312. The third layer 308 is mapped onto a third array 314. Signals from the previous layer are used in calibrating the current layer, for example, as shown by the arrows at 316, 318, 320. The arrows 322, 324,326 show activation function of the layers. Output is shown at 328.

Figure 4:
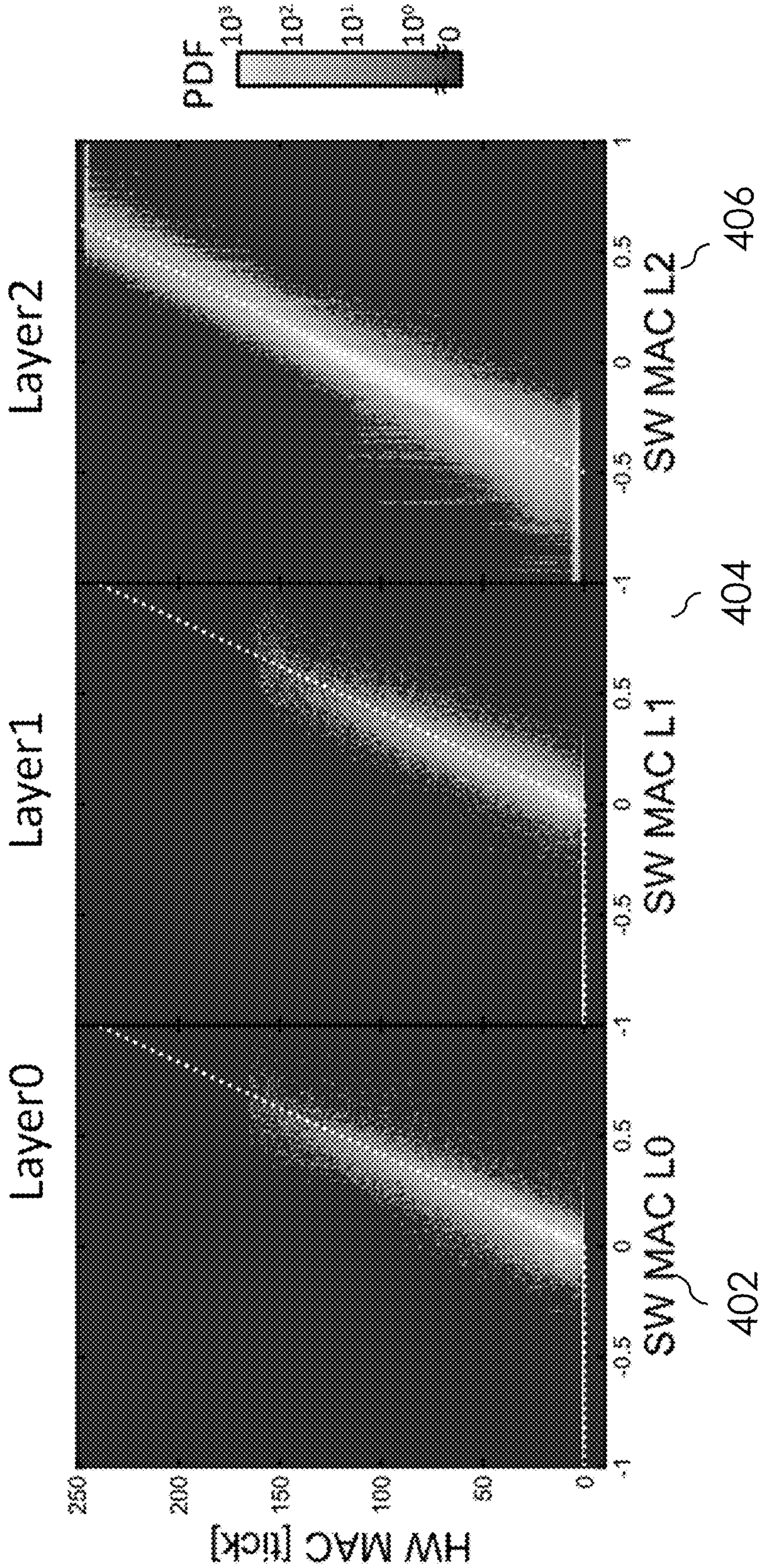
FIG. 4 shows example experimental results of calibration in an embodiment.

FIG. 4 shows example experimental results of calibration in an embodiment. The x-axis shows the desired output, for example, MAC output from software implementation, which the hardware output should reflect. The y-axis shows the actual hardware MAC operation output when calibration described herein is performed. The y-axis shows result when both the array and the activation function (e.g., analog ReLU) have been calibrated. Results for the three layers, e.g., described with reference to FIG. 3 are shown, e.g., layer 0 or first layer (L0) 402, layer 1 or second layer (L1) 404 and layer 2 or third layer (L2) 406.

Figure 5:
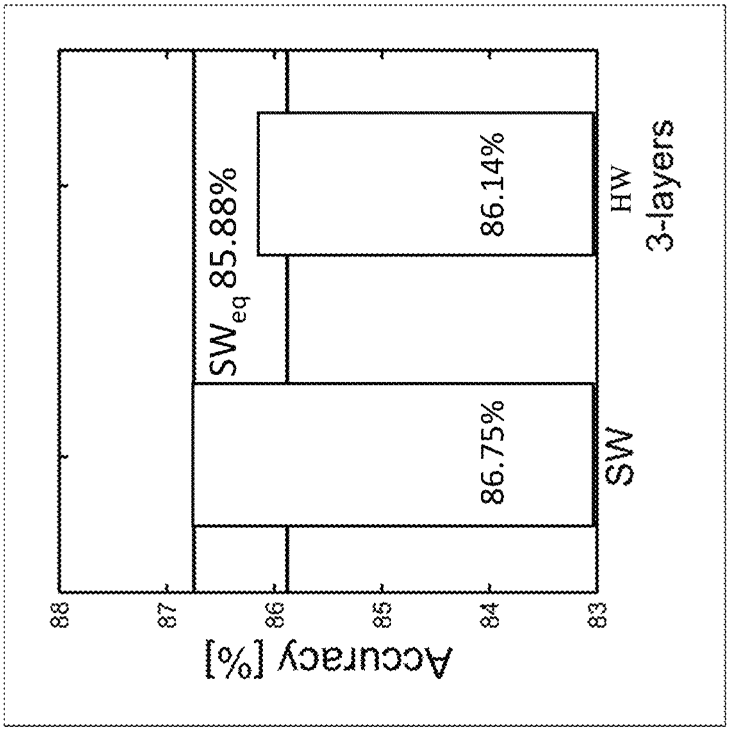
FIG. 5 illustrates an example accuracy achieved using a calibration in an embodiment.

FIG. 5 illustrates an example accuracy achieved using a calibration in an embodiment. The example shows that hardware can achieve accuracy which is software equivalent. In this particular example performance of calibration, by way of example, software accuracy is 86.75% and the corresponding hardware accuracy is 86.14%. In general, the hardware accuracy achieved can be within 99% of the software target. For instance, multiplying 86.75% by 99% results in 85.88%. Since the hardware accuracy achieved is 86.14% in this example, the hardware accuracy is over 99% of the software target.

A corresponding apparatus, which can implement or perform calibrations described herein, for example, as shown in FIG. 1, can include a plurality of crossbar arrays of resistive memory devices configured to implement a multi-layer artificial neural network, where a crossbar array of the plurality of crossbar arrays has programmed weights of a layer of an artificial neural network. At least one peripheral circuit (e.g., 118 and/or 122 shown in FIG. 1) connected to the crossbar array can be configured to calibrate the programmed weights by adjusting the programmed weights based on comparing the crossbar array's output with a target output. The crossbar array's output produced using the calibrated programmed weights can be input into a next crossbar array of the plurality of crossbar arrays that implements a next layer of the artificial neural network to calibrate weights of the next layer of the artificial neural network programmed on the next crossbar array. At least another peripheral circuit (e.g., 118 and/or 122 shown in FIG. 1) connected to the next crossbar array can be configured to calibrate the weights of the next layer of the artificial neural network programmed on the next crossbar array by adjusting the weights of the next layer based on comparing the next crossbar array's output with a next target output. Programmed weights of a subsequent crossbar array corresponding to a subsequent layer of the artificial neural network can be calibrated using, as input, hardware output produced by a previous crossbar array corresponding to a previous layer of the artificial neural network.

The flowchart and block diagrams in the Figures illustrate the architecture, functionality, and operation of possible implementations of apparatus, systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be implemented substantially concurrently, or the blocks may sometimes be implemented in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "or" is an inclusive operator and can mean "and/or", unless the context explicitly or clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof. As used herein, the phrase "in an embodiment" does not necessarily refer to the same embodiment, although it may. As used herein, the phrase "in one embodiment" does not necessarily refer to the same embodiment, although it may. As used herein, the phrase "in another embodiment" does not necessarily refer to a different embodiment, although it may. Further, embodiments and/or components of embodiments can be freely combined with each other unless they are mutually exclusive.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:

programming weights of a layer of an artificial neural network on a crossbar array of resistive memory devices;

calibrating the programmed weights by adjusting the programmed weights based on comparing the crossbar array's Multiply-and-Accumulate (MAC) output with a target MAC output; and inputting the crossbar array's MAC output produced using the calibrated programmed weights into a next crossbar array of resistive memory devices implementing a next layer of the artificial neural network to calibrate weights of the next layer of the artificial neural network programmed on the next crossbar array; and calibrating the weights of the next layer of the artificial neural network programmed on the next crossbar array by adjusting the weights of the next layer based on comparing the next crossbar array's output with a next target output, wherein programmed weights of a subsequent crossbar array corresponding to a subsequent layer of the artificial neural network are calibrated using, as input, hardware output produced by a previous crossbar array corresponding to a previous layer of the artificial neural network, wherein programmed weights of a layer k are modified and compensated for a non-linear residual error arising from previous layers 0 to k−1 that have been calibrated, by using outputs of the layer k−1 as calibration inputs for the layer k.

2. The method of claim 1, wherein the target MAC output includes software output produced at the layer of the artificial neural network run on a digital processor.

3. The method of claim 1, wherein the next target output includes software output produced at the next layer of the artificial neural network run on a digital processor.

4. The method of claim 1, wherein the calibrating the programmed weights by adjusting the programmed weights based on comparing the crossbar array's MAC output with a target MAC output, includes:

fitting the crossbar array's MAC output with the target MAC output to produce a coefficient and a bias;

reprogramming by scaling the programmed weights column-wise on the crossbar array by the coefficient;

programming bias weights to a negative of the bias; and calibrating an activation function to match a target activation function by tuning a peripheral circuit.

5. The method of claim 1, wherein the calibrating the programmed weights by adjusting the programmed weights based on comparing the crossbar array's MAC output with a target MAC output, includes:

fitting the crossbar array's MAC output with the target MAC output to produce a coefficient and a bias;

rescaling the crossbar array's MAC output by the coefficient and the bias on a digital peripheral circuit connected to the crossbar array; and numerically adjusting an activation function to match a target activation function on a digital peripheral circuit connected to the crossbar array.

6. The method of claim 1, wherein an input to a first crossbar array corresponding to a first layer of the artificial neural network whose weights are being calibrated is sampled from a training dataset.

7. The method of claim 1, wherein an input to a first crossbar array corresponding to a first layer of the artificial neural network whose weights are being calibrated is sampled from a random dataset.

8. An apparatus comprising:

a plurality of crossbar arrays of resistive memory devices configured to implement a multi-layer artificial neural network, wherein a crossbar array of the plurality of crossbar arrays has programmed weights of a layer of an artificial neural network; and at least one peripheral circuit connected to the crossbar array configured to calibrate the programmed weights by adjusting the programmed weights based on comparing the crossbar array's Multiply-and-Accumulate (MAC) output with a target MAC output, wherein the crossbar array's MAC output produced using the calibrated programmed weights is input into a next crossbar array of the plurality of crossbar arrays that implements a next layer of the artificial neural network to calibrate weights of the next layer of the artificial neural network programmed on the next crossbar array, wherein at least another peripheral circuit connected to the next crossbar array is configured to calibrate the weights of the next layer of the artificial neural network programmed on the next crossbar array by adjusting the weights of the next layer based on comparing the next crossbar array's output with a next target output, wherein programmed weights of a subsequent crossbar array corresponding to a subsequent layer of the artificial neural network are calibrated using, as input, hardware output produced by a previous crossbar array corresponding to a previous layer of the artificial neural network, wherein programmed weights of a layer k are modified and compensated for a non-linear residual error arising from previous layers 0 to k−1 that have been calibrated, by using outputs of the layer k−1 as calibration inputs for the layer k.

9. The apparatus of claim 8, wherein the target MAC output includes software output produced at the layer of the artificial neural network run on a digital processor.

10. The apparatus of claim 8, wherein the next target output includes software output produced at the next layer of the artificial neural network run on a digital processor.

11. The apparatus of claim 8, wherein the at least one peripheral circuit is configured to calibrate the programmed weights by at least:

fitting the crossbar array's MAC output with the target MAC output to produce a coefficient and a bias;

reprogramming by scaling the programmed weights column-wise on the crossbar array by the coefficient;

programming bias weights to a negative of the bias; and calibrating an activation function to match a target activation function by tuning a peripheral circuit.

12. The apparatus of claim 8, wherein said at least one peripheral circuit is configured to calibrate the programmed weights by at least:

fitting the crossbar array's MAC output with the target MAC output to produce a coefficient and a bias;

rescaling the crossbar array's MAC output by the coefficient and the bias on a digital peripheral circuit connected to the crossbar array; and numerically adjusting an activation function to match a target activation function on a digital peripheral circuit connected to the crossbar array.

13. The apparatus of claim 8, wherein an input to a first crossbar array corresponding to a first layer of the artificial neural network whose weights are being calibrated is sampled from a training dataset.

14. The apparatus of claim 8, wherein an input to a first crossbar array corresponding to a first layer of the artificial neural network whose weights are being calibrated is sampled from a random dataset.

15. A computer program product comprising a computer readable storage medium having program instructions embodied therewith, the program instructions readable by a device to cause the device to:

program weights of a layer of an artificial neural network on a crossbar array of resistive memory devices;

calibrate the programmed weights by adjusting the programmed weights based on comparing the crossbar array's Multiply-and-Accumulate (MAC) output with a target MAC output; and input the crossbar array's MAC output produced using the calibrated programmed weights into a next crossbar array of resistive memory devices implementing a next layer of the artificial neural network to calibrate weights of the next layer of the artificial neural network programmed on the next crossbar array; and calibrate the weights of the next layer of the artificial neural network programmed on the next crossbar array by adjusting the weights of the next layer based on comparing the next crossbar array's output with a next target output, wherein programmed weights of a subsequent crossbar array corresponding to a subsequent layer of the artificial neural network are calibrated using, as input, hardware output produced by a previous crossbar array corresponding to a previous layer of the artificial neural network, wherein programmed weights of a layer k are modified and compensated for a non-linear residual error arising from previous layers 0 to k−1 that have been calibrated, by using outputs of the layer k−1 as calibration inputs for the layer k.

16. The computer program product of claim 15, wherein the target MAC output includes software output produced at the layer of the artificial neural network run on a digital processor.

17. The computer program product of claim 15, wherein the next target output includes software output produced at the next layer of the artificial neural network run on a digital processor.

18. The computer program product of claim 15, wherein the device is caused to calibrate the programmed weights by at least:

fitting the crossbar array's MAC output with the target MAC output to produce a coefficient and a bias;

reprogramming by scaling the programmed weights column-wise on the crossbar array by the coefficient;

programming bias weights to a negative of the bias; and calibrating an activation function to match a target activation function by tuning a peripheral circuit.

19. The computer program product of claim 15, wherein the device is caused to calibrate the programmed weights by at least:

fitting the crossbar array's MAC output with the target MAC output to produce a coefficient and a bias;

rescaling the crossbar array's output by the coefficient and the bias on a digital peripheral circuit connected to the crossbar array; and numerically adjusting an activation function to match a target activation function on a digital peripheral circuit connected to the crossbar array.

20. The computer program product of claim 15, wherein an input to a first crossbar array corresponding to a first layer of the artificial neural network whose weights are being calibrated is sampled from a training dataset.

* * * * *